Aug. 5, 1958   H. KORDES   2,846,260
VEHICLE WHEELS
Filed Oct. 28, 1955
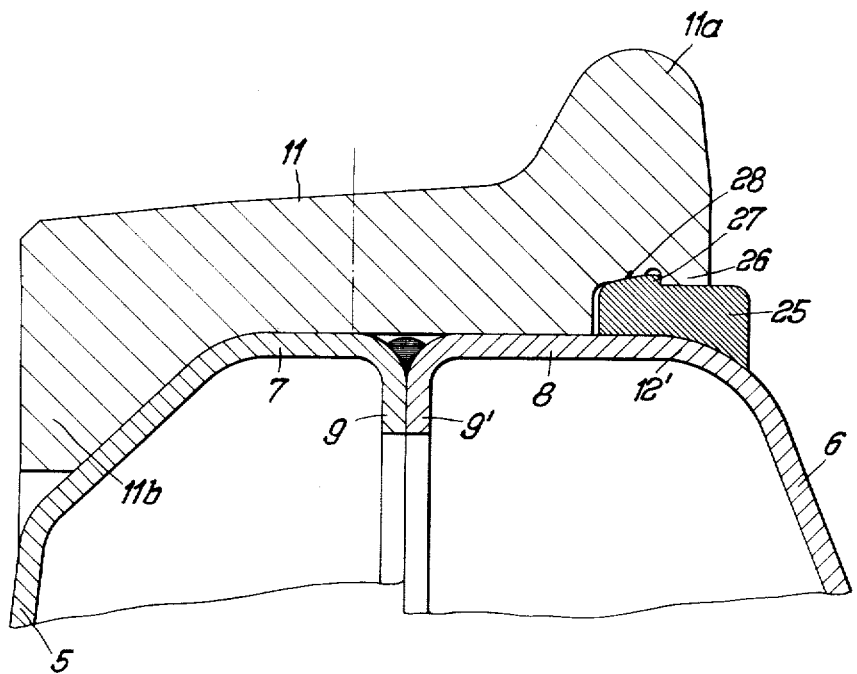
Inventor:
HEINRICH KORDES
By Young, Emery & Thompson
ATTYS United States Patent Office 2,846,260
Patented Aug. 5, 1958

2,846,260
VEHICLE WHEELS

Heinrich Kordes, Osnabruck, Germany, assignor to Klockner-Georgsmarienwerke A. G., Osnabruck, Germany Application October 28, 1955, Serial No. 543,518
Claims priority, application Germany November 2, 1954
5 Claims. (Cl. 295—15)

The present invention relates to a light-weight wheel assembly, particularly for rail vehicles, and is an improvement of the wheel assembly disclosed in my application Serial No. 395,554, now Patent No. 2,809,071, filed December 1, 1953.

In the application referred to the fixing of the fitted or shrunk-on tire is effected by means of welded seams which are provided continuously or intermittently along the peripheral edges of the wheel tire. With this method of securing, the re-tiring of the wheel body, that is to say, the replacement of the worn-out tire by a new one, involves special steps.

All methods of replacement are somewhat complicated from the point of view of production and are also time-wasting and thus expensive.

It is, therefore, an object of the present invention to provide the light wheel assembly set forth in said application with a ring arranged on the side of the rim between the wheel tire and the associated individual disc, the wheel tire and ring being formed with locking surfaces which take effect on shrinking of the tire.

The welded connection between the tire and wheel body provided in said application referred to, is thus replaced according to the invention, by a special method of spring ring securing, it being an important advantage that the new method of connection reliably prevents all deformation of the individual sheet metal discs of the wheel body.

One embodiment of the invention is illustrated in the accompanying drawing which is a sectional elevation of a portion of a light wheel body, showing only that part adjacent the wheel tire.

As in the case of the construction according to said application, each of the wheel bodies of the light wheel assembly consists of two outwardly domed individual discs 5 and 6 of relatively thin sheet metal which terminate at the top in fellow-like portions 7 and 8. The ends of these portions are bent to form annular flanges 9 and 9'. The two individual discs 5 and 6 merge near the felloe, as indicated, in the case of the disc 6, at 12', with smooth transitory arcs into the portions 7 and 8 respectively.

In applying the invention, the fixing of the wheel tire 11 which grips over the portion 7 of the disc 5, externally by means of an annular flange 11b, is effected by means of a securing ring 25, which is arranged on the side adjacent the rim 11a between the wheel tire 11 and the portion 8 of the disc 6. The securing ring is formed with an outwardly projecting collar 27 and a corresponding inwardly projecting edge flange 26 is formed on the wheel tire 11. The dimensions of the edge flange and of the collar are so related to one another that the ring 25 can be pressed with its collar or step flange 27 exactly into the edge flange recess on the wheel tire 11, when in the heated condition, until it automatically springs up behind the edge flange 26 whereafter the shrinking operation effects deeper engagement of these inter-locking surfaces. In order to facilitate the pressing-in operation, the surface 28 of the ring 25 is made slightly conical. The adjacent faces of the ring 25 and those of the individual discs 6, 8 and of the tire 11 are so designed that they come into contact with one another with locking engagement on shrinking, due to their shape. By adopting the measures described, an absolutely fast seating between wheel tire and wheel body is secured with maximum possible preservation of the sheet metal bodies comprising the individual discs and the tire is prevented from coming off during operation. Since the tire contracts on shrinking both in the radial and in the axial direction, a lateral pressure, further increasing the security of the connection, is produced by the edge flange 26 gripping over the outer collar 27.

I claim as my invention:

1. A light wheel particularly for railways comprising a pair of wheel discs each having a felloe-like portion and arranged adjacent to each other, a tire mounted around the discs and in contact with the felloe-like portions, the tire having an externally-projecting rim on one side and an internally-projecting annular flange on the other side, said tire having an internal cut-out portion with an inwardly-projecting edge flange, and a ring with an outer collar and mounted on one of the discs with the collar projecting into the cut-out portion with the outer collar contacting against the inwardly-projecting edge flange to maintain the tire on the discs on shrinking of the tire onto the felloe-like portions after heating of the tire and the cooling thereof.

2. A light wheel assembly according to claim 1, in which the adjacent faces of the ring and the tire are shaped to effect locking on shrinking of the tire.

3. A light wheel assembly according to claim 1, in which the outer surface of the axially inner portion of the ring is inclined and engages a corresponding inclined surface of the tire.

4. A light wheel particularly for railways comprising a pair of wheel discs each having a felloe-like portion and arranged adjacent to each other, a tire mounted around the discs and in contact with the felloe-like portions, the tire having an externally-projecting rim on one side and an internally-projecting annular flange on the other side, said tire having an internal cut-out portion with an inwardly-projecting edge flange, and a ring with an outer collar and mounted on one of the discs with the collar projecting into the cut-out portion with the outer collar contacting against the inwardly-projecting edge flange to maintain the tire on the discs, said tire by means of the internally-projecting flange contacting one disc and the ring contacting the other disc to maintain the tire securely mounted on the discs.

5. A light wheel particularly for railways comprising a pair of wheel discs each having a felloe-like portion and arranged adjacent to each other, a tire mounted around the discs and in contact with the felloe-like portions, the tire having an externally-projecting rim on one side and an internally-projecting annular flange on the other side, said tire having an internal cut-out portion with an inwardly-projecting edge flange, and a ring with an outer collar and mounted on one of the discs with the collar projecting into the cut-out portion with the outer collar contacting against the inwardly-projecting edge flange to maintain the tire on the discs, said discs each having an inwardly directed annular flange in contact with each other.

References Cited in the file of this patent
UNITED STATES PATENTS

| 303,700 | Broadbent | Aug. 19, 1884 |
| 464,527 | Smith | Dec. 8, 1891 |
| 2,061,324 | Michael et al. | Nov. 17, 1936 |

FOREIGN PATENTS

| 60,109 | Germany | Dec. 1, 1891 |